Oct. 27, 1970  TAKAAKI KUROKAWA ET AL  3,536,467
MOULD OPERATING MECHANISM OF GLASS BULB BLOWING MACHINE
Filed May 19, 1967  4 Sheets-Sheet 3

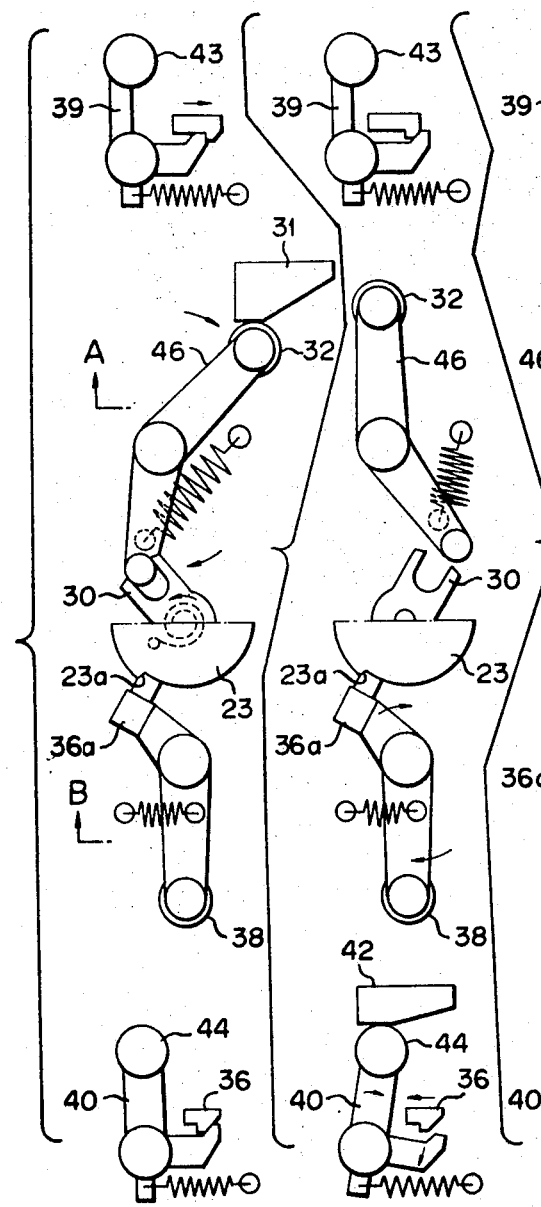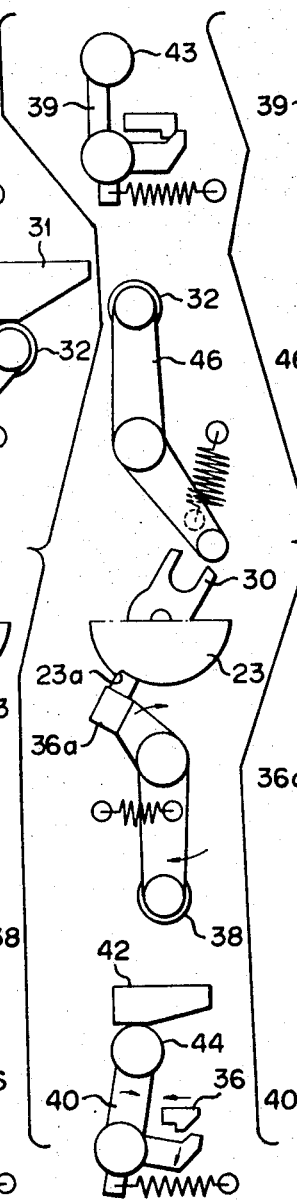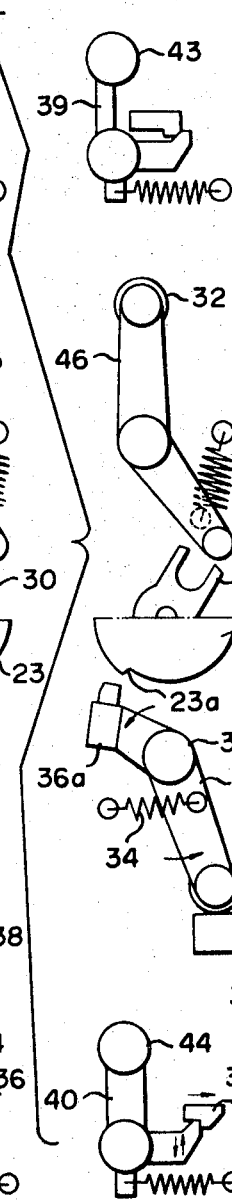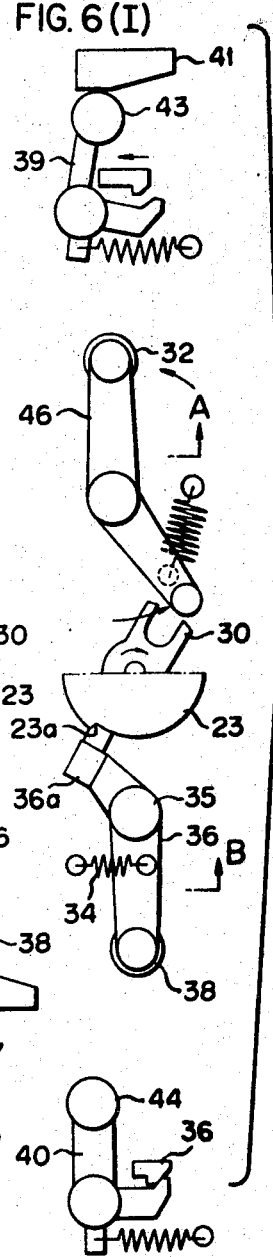

United States Patent Office 3,536,467
Patented Oct. 27, 1970

3,536,467
MOULD OPERATING MECHANISM OF GLASS
BULB BLOWING MACHINE
Takaaki Kurokawa, Chigasaki-shi, and Noboru Inoue,
Funabashi-shi, Japan, assignors to Tokyo Shibaura
Denki Kabushiki Kaisha, Kawasaki-shi, Kanagawa-ken,
Japan, a joint-stock company of Japan
Filed May 19, 1967, Ser. No. 639,897
Claims priority, application Japan, Sept. 10, 1966,
41/59,733
Int. Cl. C03b 11/16
U.S. Cl. 65—184                                                6 Claims

ABSTRACT OF THE DISCLOSURE

Parisons formed on a continuously moving glass blank are moulded by moulds carried by an endless chain conveyor. Each mould is normally closed by a resilient means and is controlled to perform a cycle of operation of closing, rotating, opening and stopping rotation. The shaft for driving said mould is divided into two parallel shafts connected together through a speed reducing gearing. These parallel shafts are mounted on one side of a link of the conveyor and other components of the mould operating mechanism are mounted on the opposite side to decrease the spacing between adjacent moulds and to decrease the quantity of waste glass.

---

This invention relates to a mould operating mechanism for use in a glass bulb blowing machine of the ribbon machine type wherein a ribbon shaped glass blank is continuously advanced, a plurality of depending parisons are formed thereon by means of blowheads while the blank is advanced and the parisons are moulded into the desired shape by means of moulds moved synchronously with the glass blank.

In blowing machines of the type referred to above, moulds are secured to chain links on an endless conveyor moved synchronously with the ribbon shaped glass blank. The conveyor is arranged beneath the glass blank.

The moulds are held open and in a manner to prevent their rotation until they are brought to enclose parisons, but are closed and caused to rotate when the parisons are advanced to a predetermined position. Such a mould operating mechanism is required to satisfy the following requirements. The closing, rotating, opening and stopping operations of the mould must be effected positively and must follow high speed operation of the blowing machine; the number of revolutions should be as low as possible; the spacing between moulds should be as small as possible to decrease waste of the glass blank where it is desired to manufacture glass bulbs or glass containers of small size even in a region wherein the moulds are closed during the normal operation of the blowing machine, the moulds can be held open as desired during a starting period, for example; the rotation of the moulds must be prevented when a parison of the glass blank is jammed between mould halves; the position in which the moulds are opened or closed must be readily adjustable by simple operation; the moulds must not be opened due to centrifugal force created by their rotation; the moulds must not gyrate; and the moulds must be readily removable and replaceable.

It is therefore an object of this invention to provide a novel mould operating mechanism which can satisfy any one or all of said requirements.

A more specific object of this invention is to provide a novel mould operating mechanism especially suitable for use in a ribbon type glass bulb blowing machine.

Another object of this invention is to decrease the spacing between adjacent moulds thereby to decrease the quantity of waste glass which must be recovered for remelting.

Still another object of this invention is to provide a novel mould operating mechanism for a ribbon type glass bulb blowing machine whereby a cycle of operation of closing, rotating, opening and stopping rotation of the mould is effected accurately.

Another object of this invention is to provide a novel mould operating mechanism whereby the mould is held closed against centrifugal force.

In accordance with a preferred embodiment of this invention, to cooperate with a ribbon type glass bulb blowing machine of the type outlined hereinabove, there is provided a mould operating mechanism comprisng a platform or a link of an endless conveyor, a driving shaft extending through the platform to project to one side thereof, a gear loosely mounted on the driving shaft and coupled thereto by means of a friction disc. The gear is adapted to mesh with a stationary rack extending along a predetermined path. A main shaft is disposed parallel to the driving shaft and operatively coupled thereto through a reduction gear mechanism. A mould operating shaft is supported by the main shaft and a resilient means is interposed between the main shaft and the mould operating shaft to impart a unidirectional biasing torque to the mould operating shaft. Mould operating members carrying mould halves are arranged to be operated by the mould operating shaft and means are provided to normally prevent the mould operating shaft from being rotated by the biasing torque and to permit the mould operating shaft to rotate in a predetermined region of the path of travel of the endless conveyor. Moreover, means are provided for the platform to normally prevent the main shaft from rotating and to permit it to rotate only in said predetermined region of said path of travel of the endless conveyor. The mould operating shaft is arranged to rotate against the biasing force of the resilient means only after the main shaft has stopped rotating.

The novel features which characterize the invention are set forth with particularity in the appended claims. The invention itself, however, both as to its organization and its method of operation together with further objects and advantages thereof may best be understood by reference to the following description taken in connection with the accompanying drawing in which:

FIGS. 6(I) through 6(IV) are diagrams to explain the operation of the novel mould operating mechanism.

Figure 1:
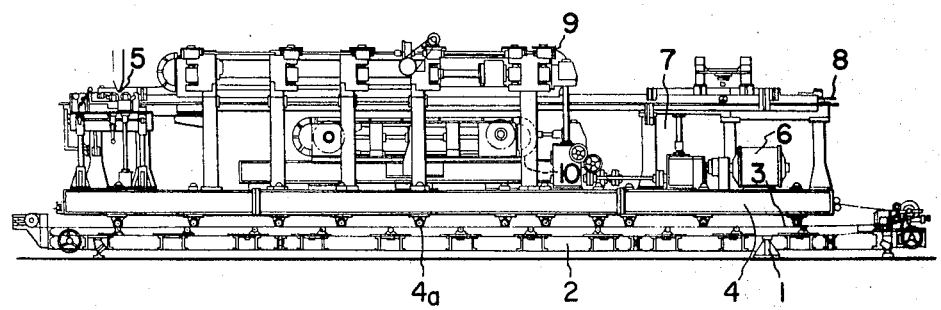
FIG. 1 is a side elevation view of a glass bulb blowing machine utilizing the mould operating mechanism of this invention.

Referring now to FIG. 1 of the accompanying drawing there is shown a general side view of a typical ribbon type glass bulb blowing machine. Since this machine forms no part of this invention, its construction and operation will be described briefly. The glass bulb blowing machine shown is of the so-called ribbon machine type and comprises a turn table 2 rotatable in a horizontal plane about a pivotal axis 1, rails 3 on the upper surface of turn table 2 and a base plate 4 supported by said rails through a plurality of vertically adjustable wheels 4a.

On the base plate 4 are supported feed rollers 5 adapted to press a stream of molten glass supplied from a not shown glass melting furnace into a ribbon shaped blank, a plate conveyor, not shown, to support and convey the ribbon shaped glass blank in the longitudinal direction of the machine, a driving means 8 driven by an electric motor 6 through a transmission mechanism 7 to drive the plate conveyor, a blowhead driving chain disposed above the plate conveyor and driven by the driving means 9, said blowhead driving chain including links each carrying a blowhead, and a mould carrying chain conveyor, not shown, disposed below said plate conveyor and driven by a driving mechanism 10, each of the links of the mould carrying chain conveyor carrying a mould operating mechanism of this invention.

The mould operating mechanism embodying this invention is actuated to open the mould when it is aligned with the glass blank and is then moved together with the glass blank while rotating whereby to mould a bulb blown by the blowhead. The details of the mould operating mechanism is shown in FIGS. 2 through 6.

Figure 2:
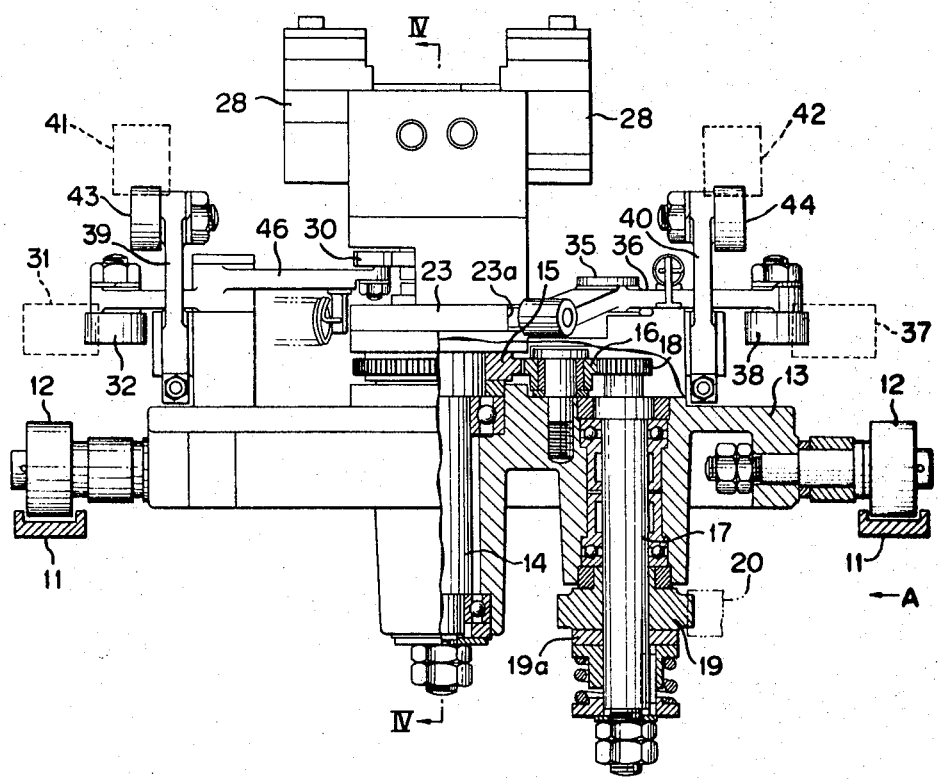
FIG. 2 is a side elevation view, partly in section, of one embodiment of the mould operating machine constructed according to this invention.
Figure 3:
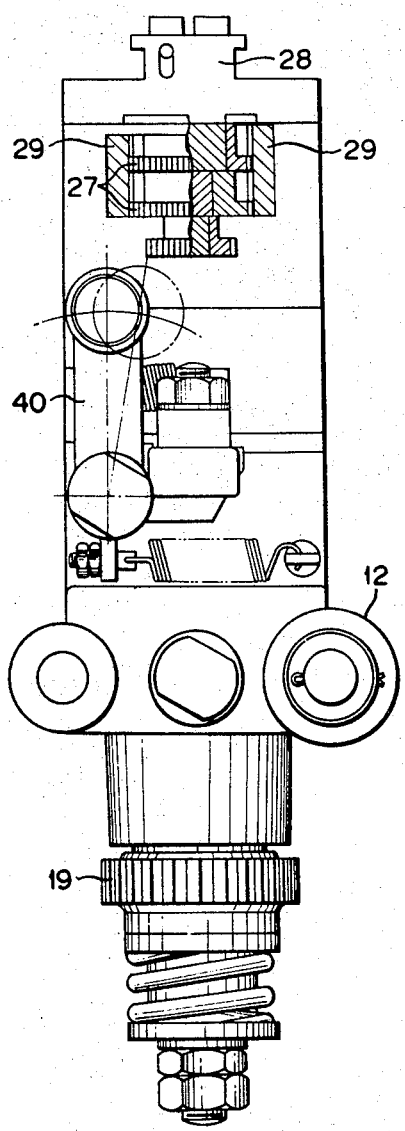
FIG. 3 is an end view, partly in section, of the mould operating machine shown in FIG. 2 as viewed in the direction of arrow A.

FIG. 2 shows a front elevation of a single mould operating mechanism and a link of a chain conveyor supporting it as viewed in the direction of travel of the chain conveyor. More particularly, a platform 13 is provided with wheels 12 to move along a pair of rails 11 secured to a frame on the bed plate 4, the platforms or links 13 being interconnected to form an endless chain conveyor. A main shaft 14 of the mould operating mechanism is rotatably journalled at the center of the platform. On the upper end of main shaft 14 there is secured a gear 15 which, through an intermediate gear 16, is operatively connected to a gear 18 secured to the upper end of a vertical driving shaft 17 on one side of platform 13. A gear 19 is mounted on the lower end of shaft 17 by means of a friction disc 19a, said gear 19 meshing with a stationary rack 20 fixed to a predetermined section of bed plate 4.

Figure 4:
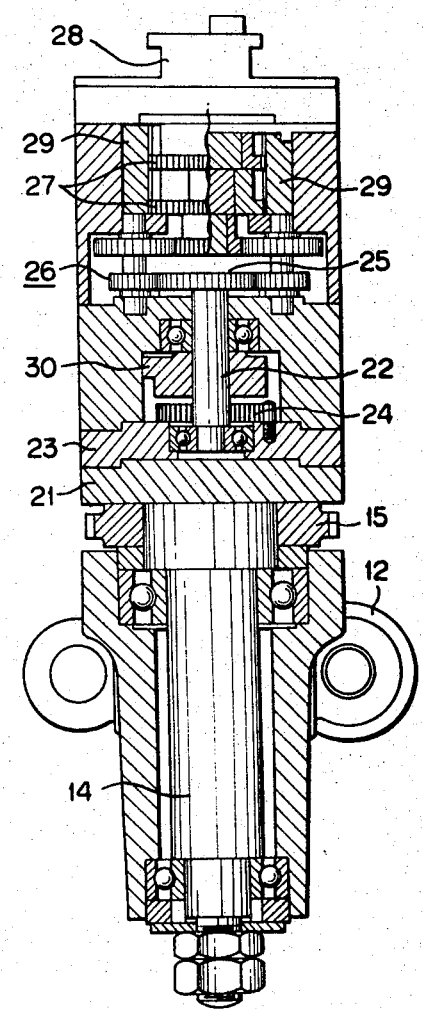
FIG. 4 is a sectional view taken along line IV—IV in FIG. 2.

As shown in FIG. 4 which is a sectional view taken along the line IV—IV in FIG. 2, a circular disc 23 adapted to rotatably support a mould operating shaft 22 is secured to a flanged upper end 21 of shaft 14, and an energy storing means in the form of a spiral spring 24 is interposed between disc 23 and shaft 22. A gear 25 is secured on the upper end of shaft 22 to drive racks 29 secured to the lower portion of mould operating members 28 through reduction gears 26 and pinions 27. Although not shown in the drawing, each mould operating member carries one half of a mould divided into two halves. Thus, as gear 27 is rotated racks 29 and mould operating members 28 are respectively moved linearly in opposite directions toward and away from each other so as to open and close mould halves carried by the mould operating members. A lever 30 including an end extending through a casing is secured to shaft 22, the bifurcated end of lever 30 loosely receiving one end of a bell crank lever 46 which is rotated by the engagement with a stationary cam 31 through a roller 32, said cam being fixed to base plate 4.

Figure 5:
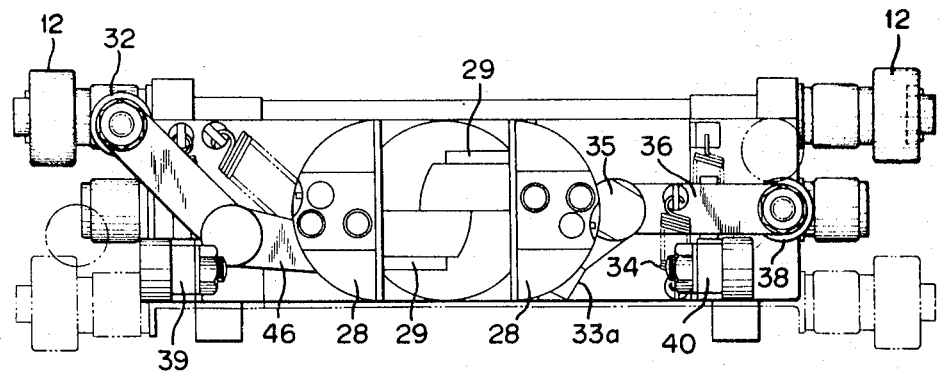
FIG. 5 is a top plan view of the machine shown in FIG. 2.

A notch 23a is formed on the periphery of said disc 23. As shown in FIGS. 2 and 5, one end of a stop lever 36 pivoted at 35 is urged against the periphery of dsic 23 by means of a spring 34, the opposite end of lever 36 being provided with a roller 38 cooperating with a plate cam 37 secured to base plate 4. Latching levers 39 and 40 are provided respectively for stop lever 36 and lever 46. These latching levers are provided with rollers 43 and 44 cooperating with cams 41 and 42, respectively, to effect latching and releasing of levers 36 and 46.

Further, the mould carrying chain conveyor comprises a plurality of interconnected links driven by driving mechanism 10 shown in FIG. 1 to move moulds in synchronism with the movement of the glass blank carried by the plate conveyor along a path beneath it.

The novel mould operating mechanism operates as follows:

FIGS. 6(I) through 6(IV) diagrammatically show successive steps of operation of the novel operating mechanism. FIG. 6(I) represents a state wherein the chain conveyor has reached the starting point of the upper horizontal run of the conveyor. In this position, it will be seen that latching lever 39 has been tilted to release bell crank lever 46. Thus, the bifurcated end of lever 30 disengages from the bell crank lever so that shaft 22 is rotated under the action of spiral spring 24 to close mould operating members 28 through gears 25, 26 and racks 29.

Immediately prior to the complete closure of the mould, gear 19 comes to engage rack 20 thus beginning to rotate as the conveyor advances. At this time, as a stop 36a carried by stop lever 36 is engaged with notch 23a of disc 23, gear 19 rotates independently of friction disc 19a, so that the rotation of gear 19 will not be transmitted to shaft 17.

As the chain advances slightly beyond this position, stop lever 36 is rotated in the counterclockwise direction by cam 37 to retract stop 36a from the periphery of disc 23 and is latched in this state by latching lever 40. Then the rotation of gear 19 is transmitted to main shaft 14 to begin to rotate the mould now in the closed condition.

While the closed mould is advanced while rotating, the blowing operation of the bulb is completed, and near the end of the upper horizontal run of the conveyor, the mould rotation is stopped and the mould is opened in the following manner.

Thus, stop lever 36 which has been held out of engagement with disc 23 by means of latching lever 40 is released when latching lever 40 engages cam 42 and is again urged against the outer periphery of disc 23 to engage notch 23a by the action of an associated spring to stop rotation of the main shaft 14 and of the mould.

As the chain conveyor further advances until roller 32 of bell crank lever 46 comes into contact with cam 31, the bell crank lever is rotated, whereby its lower end (as viewed in FIG. 6) is inserted into the bifurcated end of lever 30 to rotate the same to drive racks 29, thus opening the mould operating member and hence the mould carried thereby.

Thus, the mould operating mechanism embodying this invention is constructed such that the mould is opened or closed by the engagement of levers with respective cams supported by the base plate, so that the opening and closing operations of the mould are effected positively. Further, as the mould is normally biased to the closed position by spiral spring 24, there is no possibility of opening of the mould under the action of centrifugal force.

Further, with the construction described above, a shaft for driving the mould is divided into two shafts 14 and 17 interconnected by gears 15, 16, and 18 or other motion transmission means so that the length of the driving shaft protruding below the platform 13 can be reduced. Thus, it is possible to decrease interference of the mechanism with other components secured to adjacent chain links, which would otherwise occur when the chain passes around pulleys or sprocket wheels, thus decreasing the distance between adjacent moulds. This is advantageous especially when the machine is used to manufacture bulbs or vessels of small size such as Christmas lamps, because the quantity of waste glass which is recovered for remelting is reduced. Further, by reducing the length of the driving shaft it is possible to decrease its gyration when gear 19 comes to engage rack 20.

Moreover, since the driving shaft of the mould operating mechanism is divided into two shafts 14 and 17, and a reduction gear train is interposed between these shafts, it is possible to rotate the mould at a relatively low speed even when the glass bulb blowing machine operates at a considerably high speed.

What is claimed is:

1. In a glass bulb blowing machine wherein a ribbon shaped glass blank is conveyed along a predetermined path, a plurality of depending parisons are blown from said glass blank, and each one of said parisons is moulded into a glass bulb by a mould including two mould halves while said glass blank is conveyed along said predetermined path, a mould operating mechanism comprising: a pair of opposed mould operating members, each one of said mould operating members having means to support each one of said mould halves; a pair of opposed driving racks respectively secured to said mould operating members; a mould operating shaft; a gear driven by said shaft, said gear meshing with both of said racks to linearly move said racks and mould operating members toward and away from each other to effect opening and closing of said mould halves; a rotatably mounted main shaft; energy storing means interposed between said main shaft and said mould operating shaft operative to expend energy to impart to said mould operating shaft a unidirectional biasing torque to normally close said mould halves; means to rotate said mould operating shaft in a direction opposite to said biasing torque to open said mould halves and to restore energy to said energy storing means; and means to effect locking and releasing of said main shaft and said mould operating shaft in a predetermined sequence to effect closing, stopping of rotation and opening of said mould halves.

2. A glass bulb blowing machine according to claim 1, including a plurality of movable cams positioned along said predetermined path; and wherein said last-mentioned means is operated by said cams to effect said locking and releasing operations.

3. In a glass bulb blowing machine wherein a ribbon shaped glass blank is conveyed along a predetermined path, a plurality of depending parisons are blown from said glass blank, and each one of said parisons is moulded into a glass bulb by a mould including two mould halves while said glass blank is conveyed along said predetermined path, a mould operating mechanism comprising: a pair of opposed mould operating members, each one of said mould operating members having means to support each one of said mould halves; a pair of opposed driving racks respectively secured to said mould operating members; a rotatably mounted mould operating shaft; a gear driven by said shaft, said gear meshing with both of said racks to linearly move said racks and mould operating members toward and away from each other to effect opening and closing of said mould halves; a rotatably mounted main shaft; a spiral spring connected between said mould operating shaft and said main shaft operative to impart to said mould operating shaft a unidirectional biasing torque to normally close said mould halves; a rotatably mounted driving shaft; a speed reduction mechanism coupling said main shaft to said driving shaft; a platform comprising an endless conveyor; means to rotate said mould operating shaft in a direction opposite to said biasing torque to open said mould halves and wherein said main shaft and said driving shaft extend through said platform and project outwardly from one side thereof in parallel relationship, and means mounting said mould, mould operating shaft and spiral spring on the other side of said platform.

4. The mould operating mechanism according to claim 3 wherein a gear is mounted on said driving shaft, a friction disc mounting the last-mentioned gear, a rack secured along said predetermined path meshing with said last-mentioned gear.

5. The mould operating mechanism according to claim 3 wherein a disc is interposed between said spiral spring and said main shaft, an arm is connected to said mould operating shaft, and including means provided to cooperate with said arm and disc to selectively lock and release them to perform a cycle of operation of closing, stopping of rotation and opening of the mould.

6. In a glass bulb blowing machine wherein a ribbon shaped glass blank is conveyed along a predetermined path, a plurality of depending parisons are blown from said glass blank, and each one of said parisons is moulded into a glass bulb by a mould including two mould halves while said glass blank is conveyed along said predetermined path, a mould operating mechanism comprising: a pair of opposed mould operating members, each one of said mould operating members having means to support each one of said mould halves; a pair of opposed driving racks respectively secured to said mould operating members; a rotatably mounted mould operating shaft; a gear driven by said shaft, said gear meshing with both of said racks to linearly move said racks and mould operating members toward and away from each other to effect opening and closing of said mould halves; a platform comprising an endless conveyor; a rotatably mounted driving shaft extending through said platform and projecting outwardly from one side thereof; another gear loosely mounted on said driving shaft; a friction disc mounting said another gear on said driving shaft; a stationary rack extending along said predetermined path in mesh with said another gear; a rotatably mounted main shaft parallel to said driving shaft; a reduction gear mechanism coupling said main shaft and said driving shaft; means to impart a unidirectional biasing torque to said mould operating shaft comprising resilient means, a mould operating member carrying said mould halves and arranged to be operated by said mould operating shaft, means to normally prevent said mould operating shaft from being rotated by said biasing torque and to permit said mould operating shaft to rotate in a predetermined region of the path of travel of said endless conveyor, and means provided for said platform to normally prevent said main shaft from rotating and to permit it to rotate only in said predetermined region of said path of travel of said endless conveyor, said mould operating shaft being arranged to rotate against the biasing force of said resilient means only after said main shaft has stopped rotating.

References Cited

UNITED STATES PATENTS 1,807,566  5/1931  Canfield _____ 65—184 X
3,224,858  12/1965  Oizumi et al. _____ 65—264

ARTHUR D. KELLOGG, Primary Examiner

U.S. Cl. X.R.

65—264, 313, 359